United States Patent [19]
Ng et al.

[11] Patent Number: 5,689,305
[45] Date of Patent: Nov. 18, 1997

[54] SYSTEM FOR DEINTERLACING DIGITALLY COMPRESSED VIDEO AND METHOD

[75] Inventors: Sheau-Bao Ng, Cranbury, N.J.; Mikhail Tsinberg, Riverdale, N.Y.

[73] Assignee: Kabushiki Kaisha Toshiba, Kanagawa-ken, Japan

[21] Appl. No.: 285,555

[22] Filed: Aug. 3, 1994

Related U.S. Application Data

[63] Continuation-in-part of Ser. No. 248,001, May 24, 1994.

[51] Int. Cl.$^6$ ............................. H04N 7/01; H04N 7/36
[52] U.S. Cl. ...................... 348/416; 348/699; 348/441; 348/448
[58] Field of Search ..................... 348/552, 429–431, 348/432, 441, 473, 699, 416, 448, 452, 474, 451; H04N 7/01, 7/35, 7/36

[56] References Cited

U.S. PATENT DOCUMENTS

| Re. 35,093 | 11/1995 | Wang et al. | 348/413 |
|---|---|---|---|
| 4,789,893 | 12/1988 | Weston | 348/448 |
| 5,051,826 | 9/1991 | Ishii et al. | 348/448 |
| 5,070,403 | 12/1991 | Wilkinson | 348/413 |
| 5,305,104 | 4/1994 | Jensen et al. | 348/441 |
| 5,386,248 | 1/1995 | De Haan et al. | 348/431 |
| 5,410,354 | 4/1995 | Uz | 348/441 |
| 5,410,356 | 4/1995 | Kikuchi et al. | 348/452 |
| 5,428,397 | 6/1995 | Lee et al. | 348/452 |
| 5,488,422 | 1/1996 | Faroudja et al. | 348/448 |

OTHER PUBLICATIONS

G.M.X. Fernando and D.W. Parker, "Motion Compensated Display Conversion," Signal Processing of HDTV, pp. 393–399.

M. Weston, B.A., "Fixed, Adaptive, and Motion Compensated Interpolation of Interlaced TV Pictures," Signal Processing of HDTV, pp. 401–408.

Moustanir Lamnabhi et al., "Motion Compensated Time Rate Conversion of Video Sequences," Signal Processing of HDTV, pp. 409–418 (1988).

M.A. Isnardi et al., "Encoding for Compatibility and Recoverability in the ACTV System," IEEE Transactions on Broadcasting, vol. BC-33, No. 4, Dec. 1987.

Kris Jensen et al., "Digitally Assisted Deinterlacing for EDTV," IEEE Transactions on Circuits and Systems for Video Techn., vol. 3, No. 2, Apr. 1993.

Manfred Götze, "Generation of Motion Vector Fields for Motion Compensated Interpolation of HDTV Signals," Signal Processing of HDTV, pp. 383–418.

Information Technology—Generic Coding of Moving Pictures and Associated Audio, Recommendation H.262, ISO/IEC 13818-2, Committee Draft (Nov. 25, 1993).

*Primary Examiner*—Tommy P. Chin
*Assistant Examiner*—Vu Le
*Attorney, Agent, or Firm*—Finnegan, Henderson, Farabow, Garrett & Dunner, L.L.P.

[57] ABSTRACT

A system for deinterlacing encoded video data includes a demultiplexer for receiving the encoded video data and producing motion information and compressed video data corresponding to the encoded video data. A motion compensated predictor generates predicted image data based on the motion information corresponding to the encoded video data. A variable length decoder decodes the compressed video data corresponding to the encoded video data to produce residual data. An adder combines the residual data and the predicted image data to generate an interlace field and a memory stores picture data corresponding to the interlace field. A controller processes the motion information and generates motion vectors and a control signal corresponding to the motion information. A motion compensated deinterlacer manipulates the picture data corresponding to the interlace fields from the memory according to the motion vectors and the control signal to generate a corresponding deinterlace picture.

53 Claims, 9 Drawing Sheets

SYSTEM FOR DEINTERLACING DIGITALLY COMPRESSED VIDEO AND METHOD

This application is a continuation-in-part of U.S. patent application Ser. No. 08/248,001 filed on May 24, 1994, the content of which is relied upon and incorporated by reference.

BACKGROUND OF THE INVENTION

1. Field of the Invention

This invention relates to deinterlacing digitally compressed video, and more particularly to a system and method for deinterlacing digitally compressed video using motion compensated deinterlacing.

2. Discussion of the Related Art

Conventional television systems receive frames of video signals in an interlace format. For example, in the United States, the National Television System Committee (NTSC) standard is used to send and receive frames of television signals at a rate of 30 frames/second. Each frame contains 525 lines of video scanlines which are divided into two interlace fields. The interlace fields are transmitted at a rate of 60 fields/second (which equals 30 frames/second). The receiver scans the two interlace fields of each frame, one by one, to display the interlaced video signals as television pictures.

Many video applications use interlace scanning during image origination or capture as well as during signal transmission from the encoder, which codes the video signal, to the receiver. Digital video compression methods, such as the ISO (International Standards Organization)—MPEG (Moving Pictures Expert Group) video compression standard, may be used to reduce the data rate to a level suitable for transmission over an available digital channel. Information Technology—Generic Coding of Moving Pictures and Associated Audio, Recommendation H.262 ISO/IEC 13818-2, Committee Draft, Nov. 25, 1993 (hereinafter referred as ISO/IEC 13818-2).

Typically, digital video compression methods are based on various forms of motion-compensated predictive coding. Examples can be found in many international video compression standards such as CCITT H.261, ISO-MPEG1 and ISO-MPEG2. In these and other similar video compression systems, the compression encoder generates motion vectors and transmits information describing these motion vectors to the receivers for proper reconstruction of the encoded image sequence.

In many cases, however, the display for these digitally compressed video image sequences at the decoders may not use interlace scanning, or it may be desirable, for a variety of reasons, to use non-interlace display. For example, in large screen television displays, multimedia displays and/or computer displays which must support many text-oriented or graphics-oriented applications, a non-interlace format is often preferred over an interlace format. In such cases, it is necessary to convert a decoded interlace picture to a non-interlace display format. The process of converting an interlace picture to a non-interlace picture is generally referred to as deinterlace.

Traditionally, deinterlace has been considered an operation that is local to the receivers/decoders. Such "stand-alone" deinterlace methods enjoy the advantage of applicability over a wide variety of situations. For example, the transmission of the interlace video can be in analog NTSC (National Television System Committee), PAL (Phase Alteration Line), etc., or it can be digital, such as in MPEG (Moving Pictures Expert Group) systems. Deinterlace at the receiver does not depend on the transmission and/or the compression means.

More recently, assisted deinterlace, or cooperative deinterlace, methods have been proposed in which the encoder transmits additional information aimed specifically to help the decoder in the deinterlace process. These methods typically require that the encoder and the decoder follow a particular method of deinterlace. Both analog and digital cooperative deinterlace methods have been proposed.

Separately, it is well-known that motion-compensated deinterlace can provide excellent results, particularly for video sequences that depict moderate to rapid changes due to motion. Research in this area has focused primarily on an independent motion estimator at the receiver which produces the necessary motion model to describe the motion contained in a video sequence, and subsequently, perform vertical interpolation (i.e., deinterlace) along the motion trajectory. However, a major drawback of such motion-compensated deinterlace methods is the computationally expensive motion estimator at the receiver.

Recognizing the rapid proliferation of motion-compensated digital video compression such as MPEG, and the vast library of video materials in the interlace format, it is desirable to have a deinterlace method that can take advantage of the way in which the video sequences are digitally compressed, transmitted, and subsequently recovered/reconstructed by the digital video decoder. In particular, it is desirable to utilize the motion information from the encoder to minimize computation-intensive operations in deinterlacing by eliminating the use of computationally expensive motion estimator in the receiver.

SUMMARY OF THE INVENTION

Accordingly, the present invention is directed to a system for deinterlacing compressed video data that substantially obviates one or more of the problems due to limitations and disadvantages of the prior art.

The present invention provides an arrangement which substantially obviates one or more of the limitations and disadvantages of the described prior art.

Another advantage of the present invention is that the system takes advantage of both traditional "stand-alone" deinterlace methods as well as digitally assisted motion-compensated deinterlace methods.

The features and advantages of the invention will be set forth in the description which follows, and in part will be apparent from the description, or may be learned by practice of the invention. The objectives and other advantages of the invention will be realized and attained by the apparatus and method particularly pointed out in the written description and appended claims as well as the appended drawings.

To achieve these and other advantages, and in accordance with the purpose of the invention as embodied and broadly described, a system for deinterlacing encoded video data comprises a demultiplexer for receiving the encoded video data and producing motion information and compressed video data corresponding to the encoded video data, the compressed video data including residual data; a motion compensated predictor for generating predicted image data based on the motion information corresponding to the encoded video data; a variable length decoder for decoding the compressed video data corresponding to the encoded video data through the demultiplexer to produce the residual data; means for combining the residual data and the predicted image data to generate an interlace field; a memory for storing picture data corresponding to the interlace field; a controller for processing the motion information and generating motion vectors and at least one control signal corresponding to the motion information; and a motion compensated deinterlacer for manipulating the picture data corresponding to the interlace field from the memory according to the motion vectors and the control signal to generate a corresponding deinterlaced picture.

In another aspect, a method for deinterlacing encoded video data comprises receiving the encoded video data and producing motion information and compressed video data corresponding to the encoded video data; predicting image data according to the motion information corresponding to the encoded video data; decoding the compressed video data corresponding to the encoded video data to produce residual data; combining the image data and the residual data to generate an interlace field; storing picture data corresponding to the interlace field; processing the motion information and generating motion vectors and at least one control signal corresponding to the motion information; and manipulating the picture data corresponding to the interlace field from the memory according to the motion vectors and the control signal to generate a corresponding deinterlace picture.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention, and together with the description serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
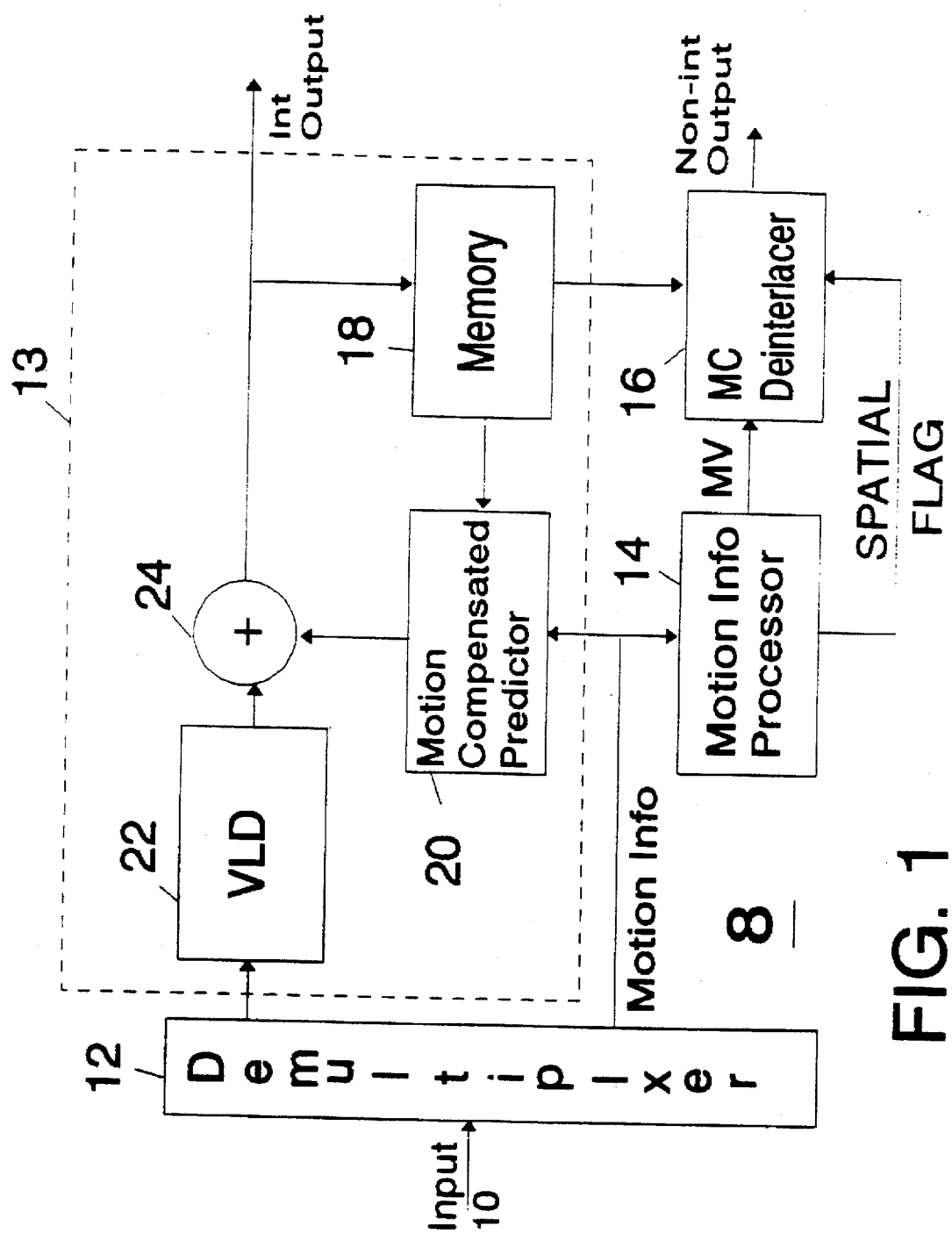
FIG. 1 is a block diagram of a deinterlacing system of a preferred embodiment of the present invention.

An exemplary embodiment of the deinterlacing system of the present invention is shown in FIG. 1 and is designated generally by reference numeral 8. In particular, FIG. 1 shows a system-level block diagram of the preferred embodiment of the present invention. In the exemplary embodiment, video decoding is assumed to be a generic motion-compensated predictive system in which motion information is sent along with the rest of the compressed data. The scanning format for the picture is assumed to be interlace. A generic decoder system, therefore, will produce interlace picture as output for display. The generic motion-compensated predictive system and the decoder system are designated by reference numeral 13. These generic systems are explained in detail, for example, in the ISO/IEC 13818-2, the contents of which are incorporated by reference herein.

As embodied herein and referring to FIG. 1, the system 8 for deinterlacing encoded video data includes encoded digital video data 10 from an encoder (not shown), input data demultiplexer 12, motion information processor 14, motion compensated deinterlacer 16, and motion-compensated predictive and decoder system 13. The motion-compensated predictive and decoder system 13 includes picture memory 18, motion compensated predictor 20, variable length decoder 22, and adder 24. The system 8 also includes an interlace output and a non-interlace output.

The encoded digital video data, including motion information and compressed video data from the encoder, is sent by a transmitter, such as a television transmitter, networks, information "super highways" and other suitable digital transmission means. Input data demultiplexer 12 receives the encoded video data and separates the motion information from the compressed video data. The compressed video data demultiplexed by demultiplexer 12 is decoded in the variable length decoder 22. The motion information is output from the demultiplexer 12 to motion information processor (MI Proc) 14. The motion information includes such information as motion vectors, prediction mode selection signal (e.g., inter-frame and intra-frame prediction), and any additional information that can be used to generate a motion model of the video sequence. The MI Proc 14 in turn provides the motion trajectory information (MV) and other control signals, such as a spatial flag, to the motion-compensated (MC) deinterlacer 16. The MC deinterlacer 16 uses the information from the MI Proc 14 to manipulate the contents of the picture memory 18, which contains image frame data, and interpolate the missing lines in each interlace field to generate a deinterlaced picture.

Before discussing the details of the motion compensated predictor and decoder system in the deinterlacing system of the present invention, the encoded digital video data from the encoder will be discussed, which is explained in detail in the ISO/IEC 13818-2.

The encoder processes current image information using an image prediction based on past transmitted image information that is stored in both the encoder and the receiver. The encoder compares the image prediction based on the past transmitted information to the current picture being processed by determining a difference between the current image information and the image prediction (which is based on previously transmitted information i.e., previously transmitted image frames). The resultant difference is called residual information or correction information. Motion information, which includes motion vectors, is used to generate prediction image of the current picture by retrieving unchanged images from previously transmitted image information. The residual information and the motion information contain the image information necessary to generate the current picture at the receiver.

The residual information contains "new" image information in the current picture that is not available from previously transmitted information. The residual information contains information necessary to update the current image prediction at both the encoder and receiver. The amount of information content in the residual information depends on the accuracy of the prediction to the current picture, i.e., the more accurate the prediction is to the current picture, the smaller the amount of information content in the residual information. For example, if the current picture and the prediction are identical, then the residual information will be zero.

Once the residual information is generated, a variable length coder compresses the data content of the residual information by assigning shorter code-words to frequent residual image events and longer code-words to less frequent residual image events. Accordingly, compressed video data (in the form of residual information) and motion information are transmitted to the receiver as encoded video data from the encoder.

Motion vectors in the motion information can be generated using "backward" or "forward" frames as long as the frames have been transmitted to the receiver. Forward frames generate forward motion vectors and backward frames generate backward motion vectors. For example, if the encoder transmits frame 1, skips frames 2 and 3, and transmits frame 4, then the encoder knows that the receiver has the picture information for frames 1 and 4. When the encoder processes (codes) frames 2 and 3 for transmission to the receiver, previously transmitted information—frame 1 (forward) and frame 4 (backward)—is used. In particular, image prediction for frames 2 and 3 can be formed from frame 1 using forward motion vectors and/or frame 4 using backward motion vectors. The image prediction can be compared to each of frames 2 and 3 to generate the residual information. Hence, the coding and the transmission order of these frames are 1, 4, 2, 3, respectively.

Once frames 2 and 3 have been coded and transmitted, the receiver displays frames 1–4 in the correct display order of 1, 2, 3 and 4. The conversion from the coding order to the display order of the frames is performed through a delay buffer. It is generally known that prediction using both forward and backward motion predictions provide excellent compression of video data.

The deinterlacing system of the present invention includes a demultiplexer for receiving the encoded video data and producing motion information and compressed video data corresponding to the encoded video data. The compressed video data includes residual data.

As embodied herein and referring to FIG. 1, the encoded video data, including the compressed video data and motion information, are input to the demultiplexer 12. The demultiplexer 12 separates the motion information from the compressed video data, which includes the residual information. The demultiplexer 12 sends the motion information to the motion information processor 14 and the compressed video data to the variable length decoder 22.

The deinterlacing system of the present invention includes a motion compensated predictor for generating predicted image data based on the motion information corresponding to the encoded video data.

As embodied herein and referring to FIG. 1, the motion compensated predictor 20 receives the motion information from the demultiplexer 12. The motion compensated predictor 20 performs a similar operation as the prediction operation at the encoder to generate a corresponding predicted image data based on the motion information. The motion information contains motion vectors of portions of the current picture that are retrievable from the previously transmitted information (i.e., previous image frames) contained in the memory 18. The motion compensated predictor 20 can be any suitable device such as SGS-Thomson STV3220 or LSI Logic L64112.

The deinterlacing system of the present invention includes a variable length decoder for decoding the compressed video data corresponding to the encoded video data through the demultiplexer.

As embodied herein and referring to FIG. 1, the variable length decoder 22 receives the compressed video data from the demultiplexer 12. The variable length decoder 22 performs an operation that is a reverse of the variable length coder at the encoder and decodes the compressed video data received from the demultiplexer 12. The residual information is regenerated from the decoding process. The variable length decoder 22 can be any suitable device such as LSI Logic L64112.

The deinterlacing system of the present invention includes means for combining the residual data and the predicted image data to generate an interlace field and a memory for storing picture data corresponding to the interlace field.

As embodied herein and referring to FIG. 1, the residual data from the variable length decoder 22 and the predicted image data from the motion compensated predictor 20 are sent to an adder 24. The adder combines the residual data and the predicted image data to produce an interlace field output. The interlace field output can be displayed on an interlace video monitor, for example. The interlace field output is also stored in the memory 18 as picture data (this now becomes a previously transmitted information).

We now turn to the deinterlacing technique of the present invention using the motion information sent from the encoder.

The deinterlacing system of the present invention includes a controller for processing the motion information and generating control signals and motion vectors, including a horizontal vector component and a vertical vector component. The controller receives the motion vectors corresponding to picture frames that span one time interval (e.g., ⅓₀ sec.) and output motion vectors corresponding to picture frames that span a second time interval (e.g., ⅟₆₀ sec.). The controller receives control signals such as a prediction mode selection signal and outputs (also through the RAM memory) a spatial flag. The spatial flag determines a particular mode of deinterlace operation, i.e., whether to suppress temporal elements in the deinterlace process.

Figure 2:
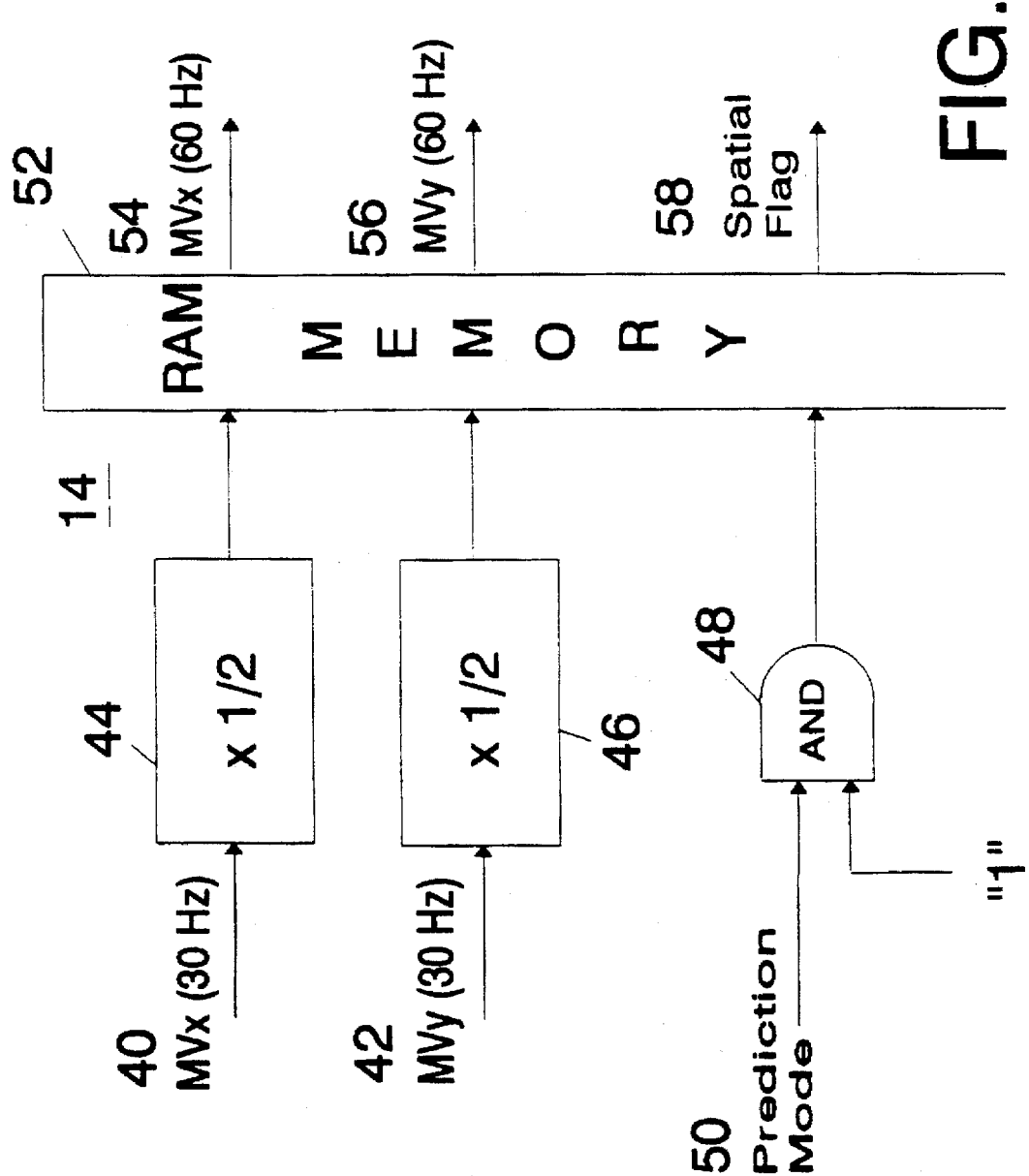
FIG. 2 is a detailed block diagram of one embodiment of the motion information processor depicted in FIG. 1.

The controller is shown as a motion information processor 14 in FIG. 2, which is a first embodiment of the motion information processor. The motion information processor 14 includes a first converter 44 and a second converter 46. The first and second converters 44 and 46 receive the horizontal (MVx 40) and vertical (MVy 42) components of the motion vector at 30-Hz, for example, and process these vector components according to a set conversion algorithm. For example, a linear conversion algorithm may be used to convert the 30-Hz motion vectors to a 60-Hz motion vectors by multiplying the 30-Hz motion vectors by ½. The linear conversion algorithm is explained in more detail below. Other suitable conversion algorithms may be used, as appropriate, to produce the 60-Hz motion vectors, MVx 54 and MVy 56.

The motion information processor 14 includes a logic gate to process the control signals such as a prediction mode signal. For example, FIG. 2 shows an AND gate 48 which receives the prediction mode signal 50 at one of its inputs.

The other input of the AND gate 48 is tied to a "1." Hence, the output of the AND gate 48 is transparent to the prediction mode selection signal 50.

The results of the first and second converters 44 and 46 and the AND gate 48 are transmitted to a RAM memory 52. In FIG. 2, the RAM memory serves as both delay-compensation and latches for the processed motion information including the motion vectors and control signals.

In practical implementations, scaling of the motion vectors is accomplished by a simple shift operation on the binary representations of the horizontal and the vertical components of the 30-Hz motion vectors. The scaled motion vectors, as well as the spatial flag signal, are kept in memory (a small amount of RAM) because the same data is used for both fields of the same frame, as will be explained shortly. In addition, some delay will be required to compensate for the time the motion information for a particular pixel block is available from the input data to the time that the pixel block is deinterlaced.

In compression systems such as the ISO-MPEG1 or ISO-MPEG2, motion vectors are related to the motion trajectory corresponding to, for example, a 16×16 block of pixels (although a 16×16 block of pixels are discussed, other N×N blocks of pixels may be used, where N is an integer and the present invention is in no way limited to 16×16 block of pixels). For a 60-Hz, 2:1 interlace video pictures (e.g., NTSC video), which are coded as 30-Hz frames, the corresponding motion vectors can be considered as motion trajectory over 1/30 second intervals. In other words, the motion vector for any one 16×16 block of pixels represents the motion trajectory of that 16×16 block of pixels between two consecutive frames which are temporally 1/30 second apart.

For the purpose of deinterlace in which 60-Hz deinterlace pictures are desired, these compression motion vectors as well as related motion information (e.g., prediction mode selections) need to be processed. One approach is to assume that the motion is sufficiently linear over the frame-to-frame interval of 1/30 second. As discussed above, the motion vectors can be derived from the 30-Hz motion vectors by multiplying the 30-Hz motion vectors by ½, for example. The multiplication is performed on both the horizontal (MVx) and the vertical (MVy) components of the 30-Hz motion vector for a particular 16×16 block of pixels.

In addition to the 30-Hz motion vectors for each 16×16 pixel block, the MI Proc 14 also includes an input for a prediction mode signal 50 for each 16×16 pixel block. This prediction mode signal 50 is used to set the spatial flag 58. The spatial flag 58 informs the MC deinterlacer 16 whether to suppress the temporal element in the deinterlace process, i.e., whether to use only the spatial interpolation in the deinterlace of the indicated block of pixels. The spatial flag 58 is set when the prediction mode for a particular 16×16 pixel block is in an "intra-frame" mode. In an intra-frame mode, motion information is not used for the deinterlace because, for example, the images are changing too rapidly or a picture contains spatially complex patterns which can lead to incorrect motion information. In MPEG compression systems, the motion vectors and the block prediction mode information are readily extracted from the compressed video bitstream by decoding the bitstream in accordance to the MPEG bitstream syntax specification. In other compression systems, similar information is either directly available to the decoder, or can be easily derived at the decoder.

In MPEG-2 systems, however, the motion information may be used optionally even under the intra-frame mode, which is a distinction from the MPEG-1 systems. In particular, MPEG-2 systems allow optional use of concealment vectors under the intra-frame mode. For example, if the transmitted image data, under the intra-mode, becomes corrupt and unusable, then the concealment vectors, if available, may completely replace the corrupted image data. Concealment vectors are those vectors which are previously stored in the picture memory 18 for use in such emergency conditions. Thus, the MPEG-2 systems allow backup image data to be displayed in place of a corrupted image data.

Figure 3:
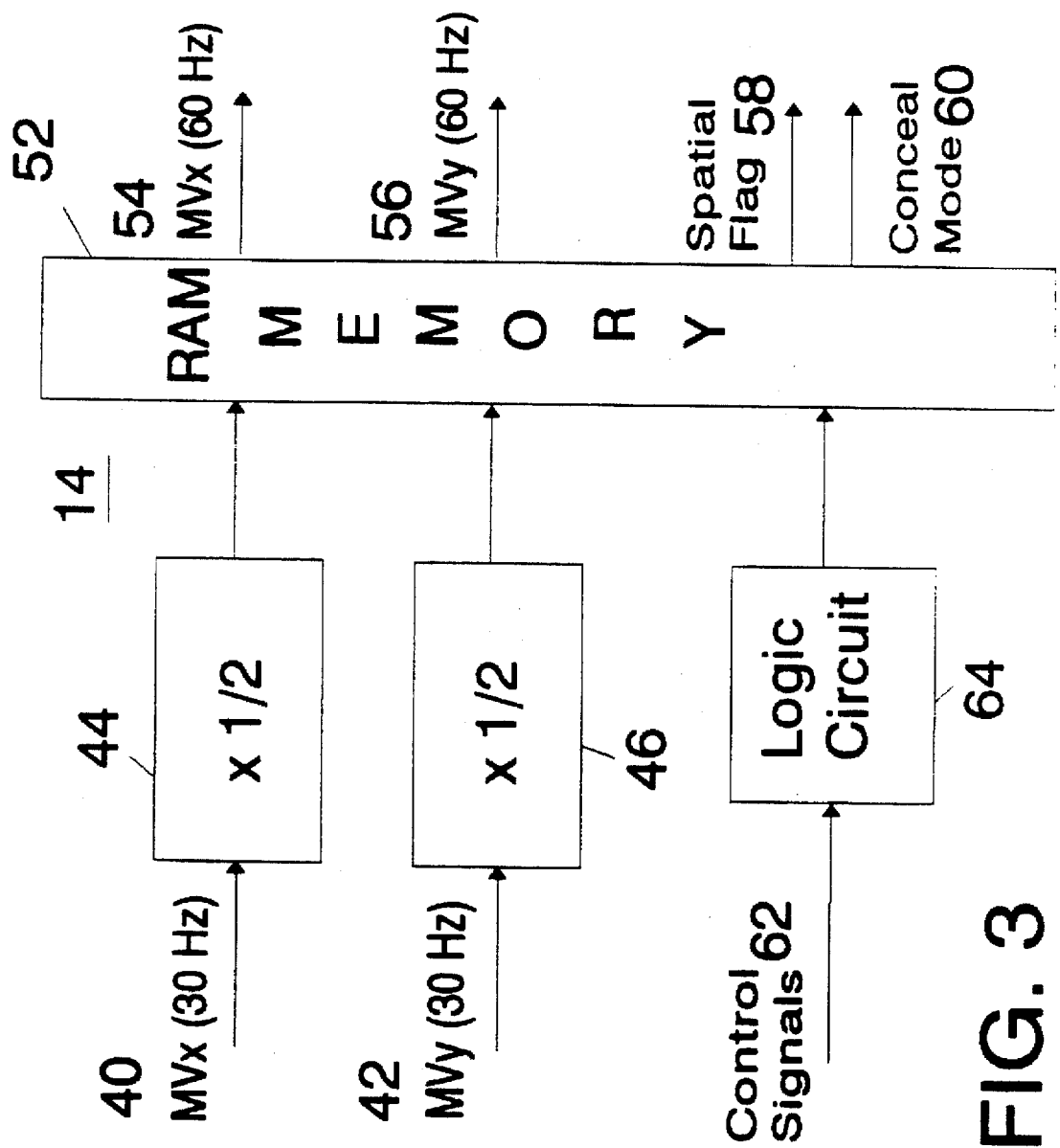
FIG. 3 is a detailed block diagram of another embodiment of the motion information processor depicted in FIG. 1.

The concealment vector system is shown in FIG. 3 which is another embodiment of the motion information processor 14. FIG. 3 is similar to FIG. 2 except for the control signal processing portion. In particular, since the motion information may now contain concealment vector information, the AND gate 48 in FIG. 2 needs to be replaced by a logic circuit capable of processing additional information. Accordingly, FIG. 3 shows a logic circuit 64 which receives the control signals 62, including the prediction mode signal and the concealment mode signal. If the concealment vector information is included in the motion information (which is optional), then the motion information processor 14 outputs an appropriate concealment mode signal 60. Thus, the motion compensated deinterlacer 16 can use the concealment vectors, if available, under the intra-frame mode.

The deinterlace system of the present invention includes a motion compensated deinterlacer for manipulating the picture data corresponding to the interlace field from the memory according to the motion vectors and the control signal to generate a corresponding deinterlace picture. The deinterlace operations affect only the missing scan lines for the interlace field for display. The normal scan lines of the interlace field are unaltered. The normal scan lines and the affected missing scan lines are multiplexed and displayed as a non-interlace output.

Figure 4:
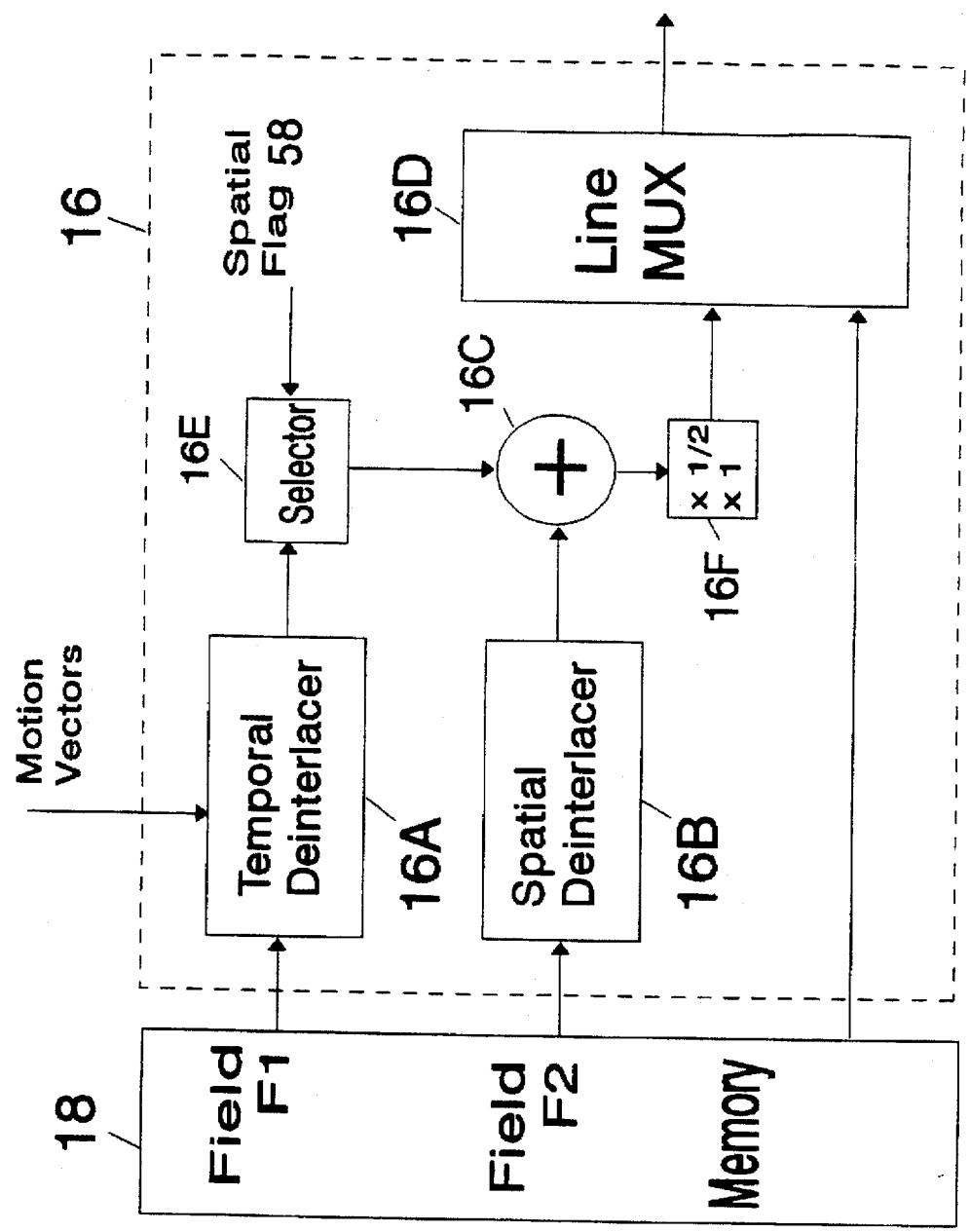
FIG. 4 is a detailed block diagram of the motion compensated deinterlacer depicted in FIG. 1.

As embodied herein and referring to FIG. 4, the motion compensated deinterlacer includes a temporal deinterlacer 16A, a spatial deinterlacer 16B, an adder 16C, a line multiplexer 16D, a selector 16E, and a multiplier 16F.

The operation of the motion compensated deinterlacer 16 is now explained.

The picture memory 18 is assumed to be at least equivalent to one frame (or two interlace fields). In practice, the picture memory 18 for the deinterlacing process can be implemented as shared memory with the compression decoding process. For illustrative purpose, the picture memory 18 is shown as comprising two sections, F1 and F2, each corresponding to one of the two interlace fields that make up a frame.

Suppose that the field shown as F2 is the current interlace field, i.e., the interlace field currently undergoing the deinterlace process. The field marked F1 represents the field that precedes F2 in display order. The two deinterlace modules, temporal deinterlacer 16A and spatial deinterlacer 16B, operate on F1 and F2, separately and independently. The spatial deinterlacer 16B operates on the current field. Depending on the spatial flag 58, the outputs from the two modules may or may not be combined by the adder 16C. If the spatial flag indicates that both the temporal and the spatial elements should be combined, then the two outputs from the temporal and spatial deinterlacers are added together. The combined result may be multiplied by ½ (i.e., an average), for example, to produce the missing scan lines of the interlace field for the deinterlace output picture. If only the spatial element is desired, then the temporal element is suppressed and the result is multiplied by 1.

The normal scan lines of the current interlace field are unaltered. The deinterlace operations only affect the missing scan lines for the current interlace field. This multiplexing of the output picture scan lines is performed by the line multiplexer 16D.

The spatial deinterlacer 16B operates on the current field F2 and generates a set of scan lines corresponding to the missing scan lines for F2 using the spatial interpolation process. The preferred embodiment of this invention uses a directional low-pass filter (DLPF) in the spatial interpolation process. The filter is a simple 2-tap finite-impulse-response (FIR) filter, for example. The output of the filter represents an average of two input pixel values, i.e., both filter tap weights are set to ½. For every output pixel, the choice of the two input pixels varies depending on the direction of the filter.

Figure 5:
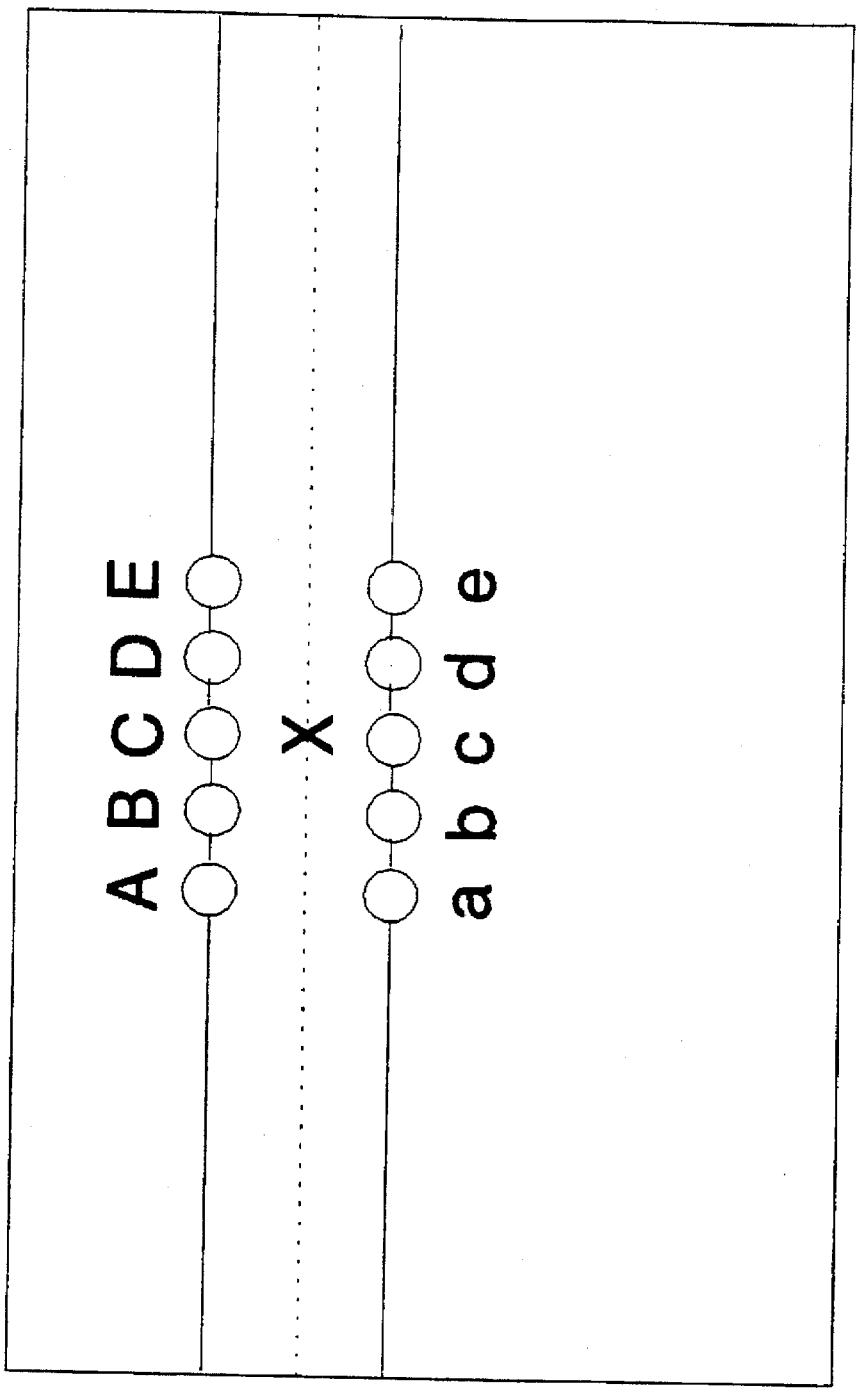
FIG. 5 is a diagram illustrating a directional filter.

As embodied herein and referring to FIG. 5, the direction of the filter in the spatial interpolation process can be in many directions. For example, FIG. 5 shows five possible directions as indicated by a set of 10 input pixels from two consecutive scan lines of the current interlace field. These input pixels are labeled as A, B, C, D, and E, for the upper scan line and a, b, c, d, and e for the lower scan line. The dashed line between the two scan lines is the line of interpolated pixels corresponding to the missing scan line for the current interlace field. The pixel marked "X" is an output pixel from the filter. The two input pixels to the filter can be one of the following five pairs of pixels: (A,e), (B,d), (C,c), (D,b), and (E,a). For example, the pixel pair (C,c) corresponds to a vertical directional filter and is a suitable choice for use along the edge of a vertical object in a scene.

The total number of directions is quite arbitrary. The filter direction should be set along any "edge" that may exist within the picture. Edges are defined as two pixels with an absolute difference below some threshold. In FIG. 5, the absolute value of the difference between the two pixels within each pixel pair (A,e), (B,d), (C,c), (D,b), and (E,a) are compared among each other and the pair which yields the minimum absolute difference is used for the filtering operation. In the event that all five pairs yield absolute differences that are below a threshold, or if all five absolute difference values are relatively close to each other, the vertical direction may be used, i.e., the pair (C,c) is selected. This situation can arise in areas of the picture which contain no prominent or strong edges, for example. In relatively flat areas of the picture, the absolute differences from the five pixel pairs would all be below a threshold. In highly textured areas, the absolute differences from the five pixel pairs would all be close to one another.

One embodiment of a directional spatial interpolator (DSI) for carrying out the spatial interpolation process, as explained above, is shown in FIG. 7. The DSI 68 comprises a series of pixel delay elements, simple arithmetic operators, and some selection logic. The arrangement of the delay elements makes available all the pixels identified in FIG. 5, namely A, B, C, D, and E and a, b, c, d, and e.

Figure 7:
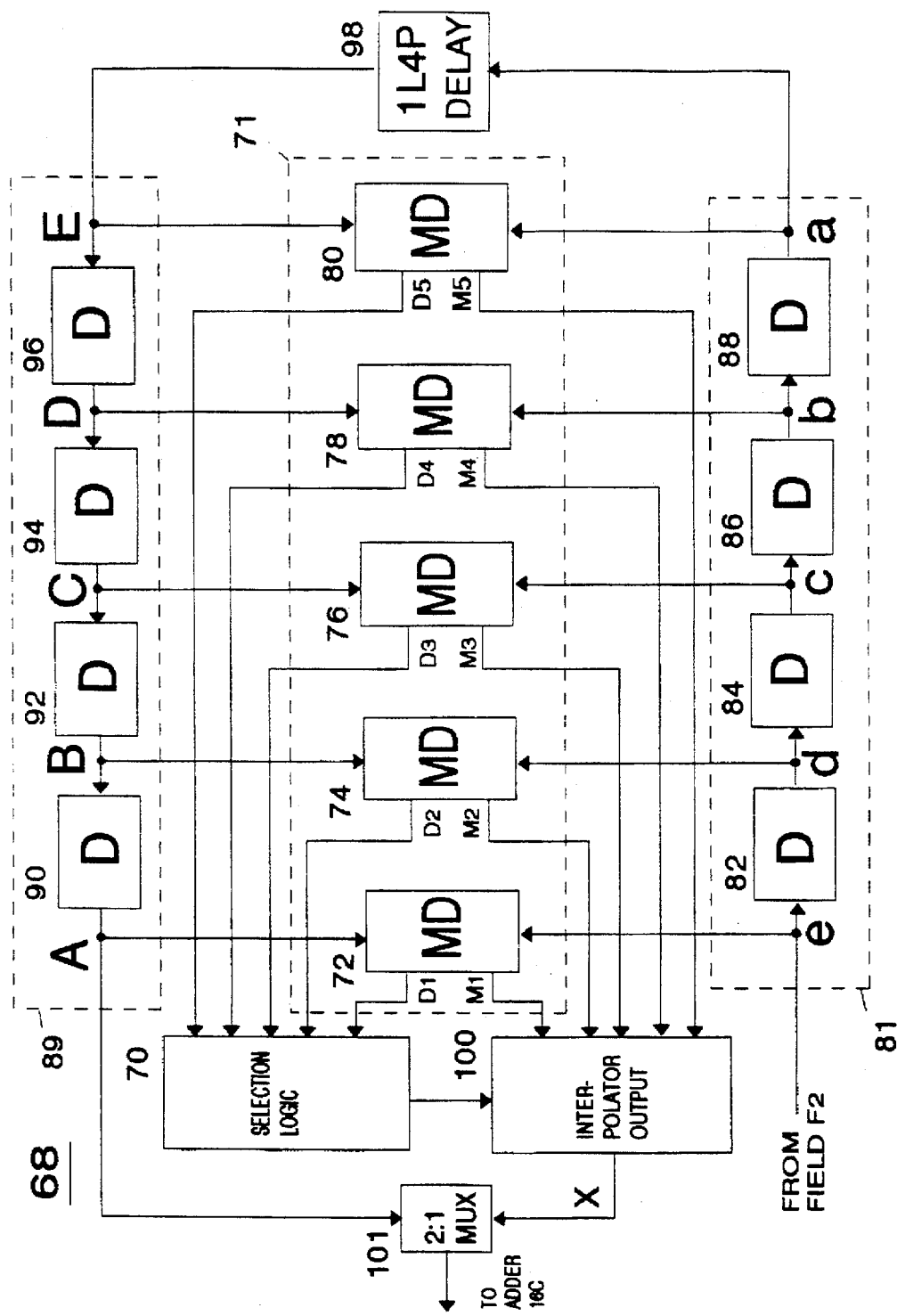
FIG. 7 is a detailed block diagram of a directional spatial interpolator of the present invention.

Referring to FIG. 7, the directional spatial interpolator, which is a part of the spatial deinterlacer 16B (see FIG. 4), includes a selection logic circuit 70, mean-and-difference (MD) unit 71, a first pixel delay 81, a second pixel delay 89, a delay 98 which represents a 1 scan-line minus 4 pixel (1L4P) delay, art interpolator output 100, and a multiplexer 101. The MD unit 71 includes a plurality of MD operators 72, 74, 76, 78, and 80. The first pixel delay 81 includes a plurality of single pixel delay elements (D) 82, 84, 86, and 88. The second pixel delay 89 includes a plurality of single pixel delay elements (D) 90, 92, 94, and 96.

The directional spatial interpolator includes first delay means, a line delay, and second delay means. The first pixel delay means receives the picture data of the second interlace field (Field F2 from memory 18) and delays the picture data in pixel units. The first pixel delay means outputs first pixel data and a plurality of first output data. The line delay means receives the first pixel data from the first pixel delay means and delays the first pixel data. The second pixel delay means receives the delayed first pixel data from the line delay means and further delays the delayed first pixel data in pixel units. The second pixel delay means outputs second pixel data and a plurality of second output data.

The video input from field F2 of memory 18 (see FIG. 4) is applied to the first pixel delay 81 at the pixel delay element 82. Each subsequent pixel delay delays the input by one pixel. Each of the pixel values (a, b, c, d, and e) and (A, B, C, D, and E) are applied to corresponding MD operators of the MD unit 71. For example, pixel pair (A,e) are applied to MD 72 and pixel pair (B,d) are applied to MD 74 and so on, where "A" and "B" are outputs from the second pixel delay 89 and "e" and "d" are outputs from the first pixel delay 81.

The first pixel delay 81 outputs first pixel data, i.e., the output from pixel delay element 88 (pixel output "a" from the first pixel delay 81), which is applied to 1L4P delay 98. The 1L4P delay 98 provides a delay of 1 scan-line minus 4 pixels. Hence, since each pixel delay element "D" represents a single pixel delay and "1L4P" represents a 1 scan-line minus 4 pixel delay, the pixel outputs "E" and "e" in FIG. 7 are exactly 1 scan-line apart.

Figure 8:
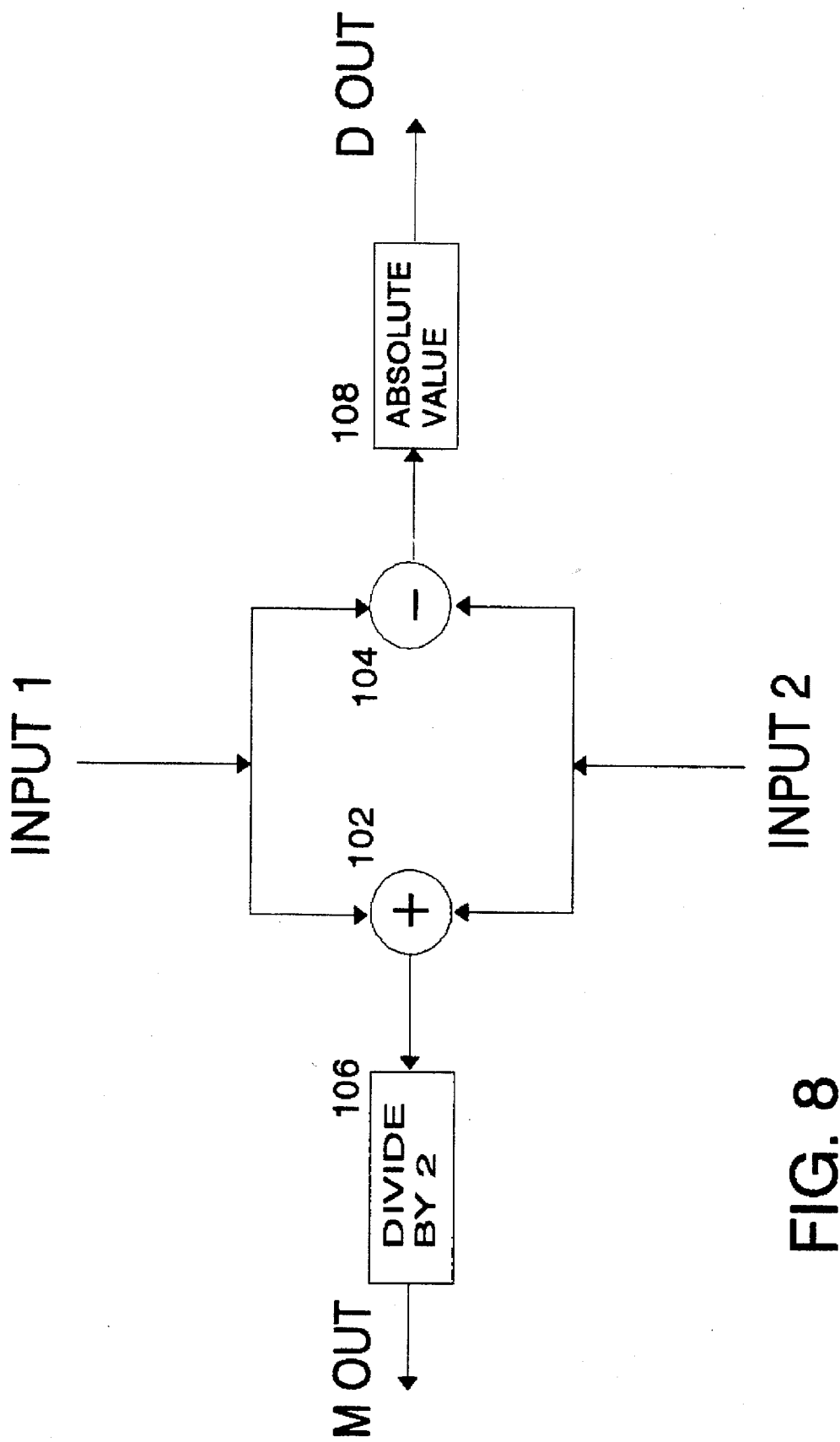
FIG. 8 is a detailed diagram of a mean-and-difference (MD) unit in FIG. 7.

Each of the pixel value pairs (A,e), (B,d), (C,c), (D,b) and (E,a), where a, b, c, d and e correspond to first output data from the first pixel delay 81 and A, B, C, D and E correspond to second output data from the second pixel delay 89, are processed by a separate arithmetic operator shown in FIG. 7 as the MD (mean-and-difference) unit 71. Each of the pixel value pairs are applied to the corresponding MD operators 72, 74, 76, 78, and 80 of the MD unit 71, as input data. The outputs of the MD operators 72, 74, 76, 78, and 80 are the mean (average value) of the two inputs from each of the pixel value pairs and the magnitude (absolute value) of the difference between each of the pixel value pairs. FIG. 8 illustrates the function of the MD unit 71.

The directional spatial interpolator includes means for receiving the plurality of first and second output data from the first and second pixel delay means, respectively, and for determining corresponding plurality of averages and plurality of differences (MD operators) of the plurality of first and second output data.

Referring to FIG. 8, each of the MD operators receives two inputs corresponding to the pixel value pairs (A,e), (B,d), (C,c), (D,b) and (E,a). Taking MD operator 72 as an example (since the MD operators are identical), pixel value "A" and pixel value "e" are input to the MD operator 72 as INPUT 1 and INPUT 2. In the mean or average value section, the MD operator 72 adds INPUT 1 and INPUT 2 with an adder 102 and then divides the sum with a divider 106 to output the mean, M out. In the difference section, the MD operator 72 computes a difference between INPUT 1 and INPUT 2 with a subtracter 104 and outputs an absolute value (108) of the difference, D out. The other MD operators 74, 76, 78 and 80 operate similarly to the MD operator 72.

The two outputs, M out and D out, of each of the MD operators are fed to two separate modules that perform the selection logic and output the interpolated value. In particular, the mean outputs are applied to the interpolator output 100 and the difference outputs are applied to the selection logic circuit 70.

The directional spatial interpolator includes a selection logic circuit which receives the plurality of differences from the difference determining means (MD operators) and selects a direction value corresponding to the plurality of differences.

In FIG. 7, the selection logic circuit 70 reads the differences (D1, D2, ... D5) from the MD operators of the MD unit 71 and decides which pixel direction to select among the directions corresponding to the pixel value pairs (A,e), (B,d), (C,c), (D,b) and (E,a), where (C,c) is the vertical direction, for example. The selection from the selection logic circuit 70 is output to the interpolator output 100. The decision logic for the selection logic circuit 70 is shown in a flowchart in FIG. 9.

Figure 9:
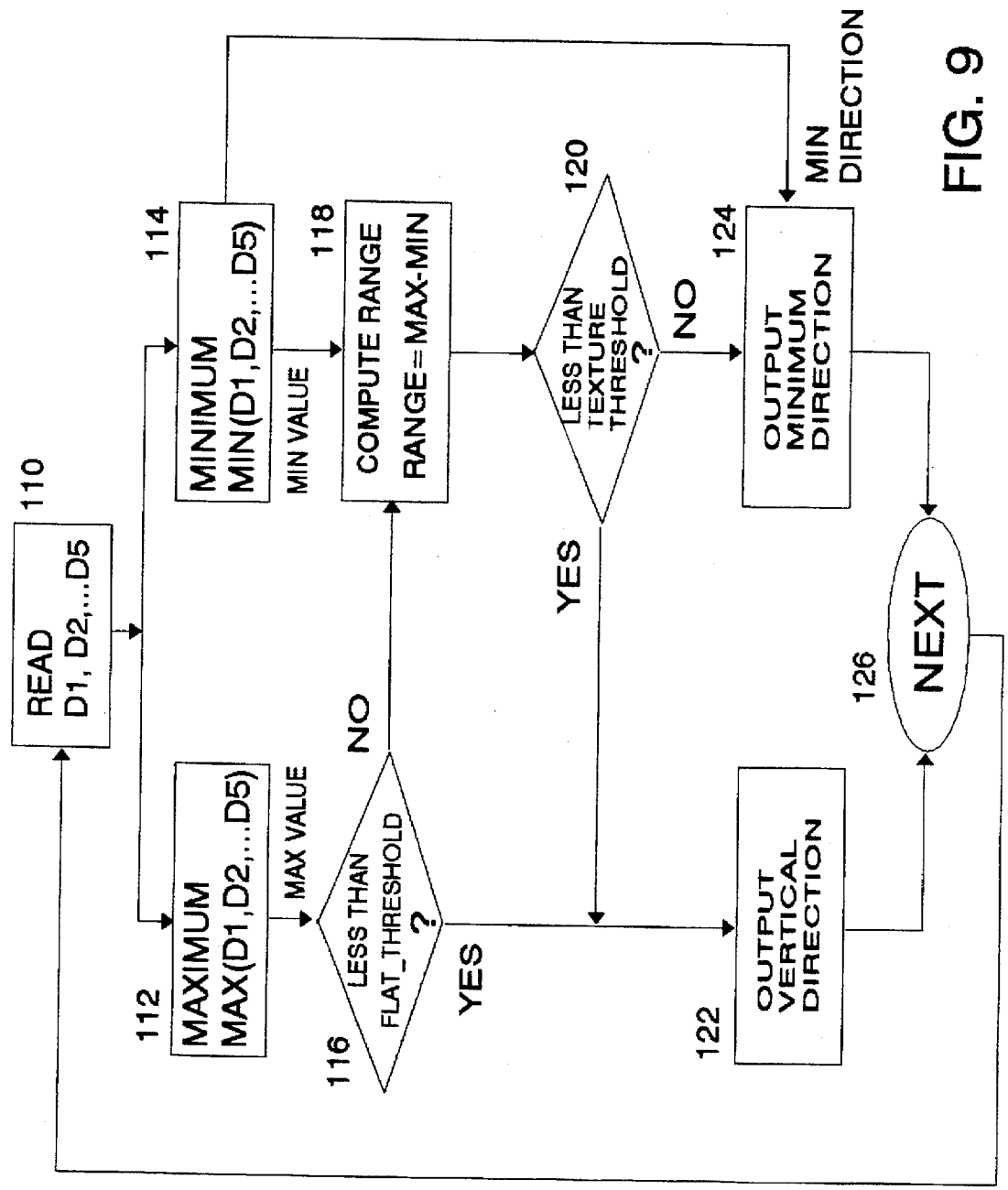
FIG. 9 is a flowchart of the operation of the directional spatial interpolator in FIG. 7.

Referring to FIG. 9, the selection logic circuit 70 reads the values D1, D2, ... D5 at step 110. Then, the selection logic circuit 70 determines whether an image is in a flat area. This is done by checking whether the values D1, D2, ... D5 are all below a certain threshold value. A simple implementation of this method is to determine the maximum value of D1, D2, ... D5 (step 112) and check whether the maximum value is below the threshold value (step 116). In FIG. 9, the threshold is denoted as FLAT_THRESHOLD. If the image is less than FLAT_THRESHOLD, then the vertical direction is selected (step 122), which is the direction of (C,c) in FIG. 5. Then, the next values are read (step 126).

If the maximum value is not less than FLAT_THRESHOLD, then the selection logic circuit 70 determines whether the image is is in a highly textured area. This is done by computing (step 118) the difference between the minimum (step 114) and the maximum values of D1, D2, ... D5, i.e., the range spanned by the values D1, D2, ... D5. If the range is less than another threshold, TEXTURE_THRESHOLD, then the image is determined to be textured (step 120). However, if the range is not less than TEXTURE_THRESHOLD, then the pixel pair having the minimum difference, which is computed in step 114, is output (step 124). Then, the next values are read (step 126).

Although step 114 of determining the minimum value is shown in FIG. 9 to be immediately after the reading step 110, step 114 can be placed between the step of comparing the maximum value to the FLAT_THRESHOLD (step 116) and the step of computing the range (step 118).

Accordingly, if the selection logic circuit 70 determines that the image is in either the flat or highly textured area, the direction will be set to a prescribed one, such as the vertical direction as represented by the pixel pair (C,c) in FIG. 5. Otherwise, the selection logic circuit 70 will pick the pixel pair corresponding to the minimum difference magnitude as the selected direction and output to the interpolator output 100.

The directional spatial interpolator includes an interpolator output which receives the plurality of averages from the average determining means (part of the MD operators) and the direction value from the selection logic circuit and outputs one of the plurality of averages according to the direction value.

The interpolator output 100 can be a simple switch having multiple inputs and a single output. The direction value from the selection logic circuit 70 selects one of the five mean outputs (M1, M2, ... M5) to be switched to the output according to the direction value received from the selection logic circuit 70. For example, if the selection logic circuit 70 selects the vertical direction (C,c), then the interpolator output 100 switches M3 to the multiplexer 101. The switched output is the interpolated value for the pixel marked X in FIG. 5.

The directional spatial interpolator includes a multiplexer which receives the second pixel data from the second pixel means and one of the plurality of averages from the interpolator and outputs interpolated data multiplexed between the second pixel data and one of the plurality of averages.

As shown in FIG. 7, a 2:1 line multiplexer 101 receives the pixel data from the second pixel data 81 and the switched output X from the interpolator output 100 and outputs corresponding multiplexed data. The multiplexed data from the multiplexer 101 is output to the adder 16C of the motion compensated deinterlacer 16 (see FIG. 4).

As embodied herein and referring to FIG. 4, the temporal deinterlacer 16A operates on the field F1. The temporal deinterlacer has two stages of operations. The first stage is a spatial interpolation process and the second stage is a block motion process. The spatial interpolation process of the temporal deinterlacer module 16A may be identical to the spatial interpolation process of the spatial deinterlacer module 16B, described above. However, the locations of the interpolated scan lines in F1 are exactly the complements of those in F2, which is the essence of the 2:1 interlace scanning format.

Figure 6:
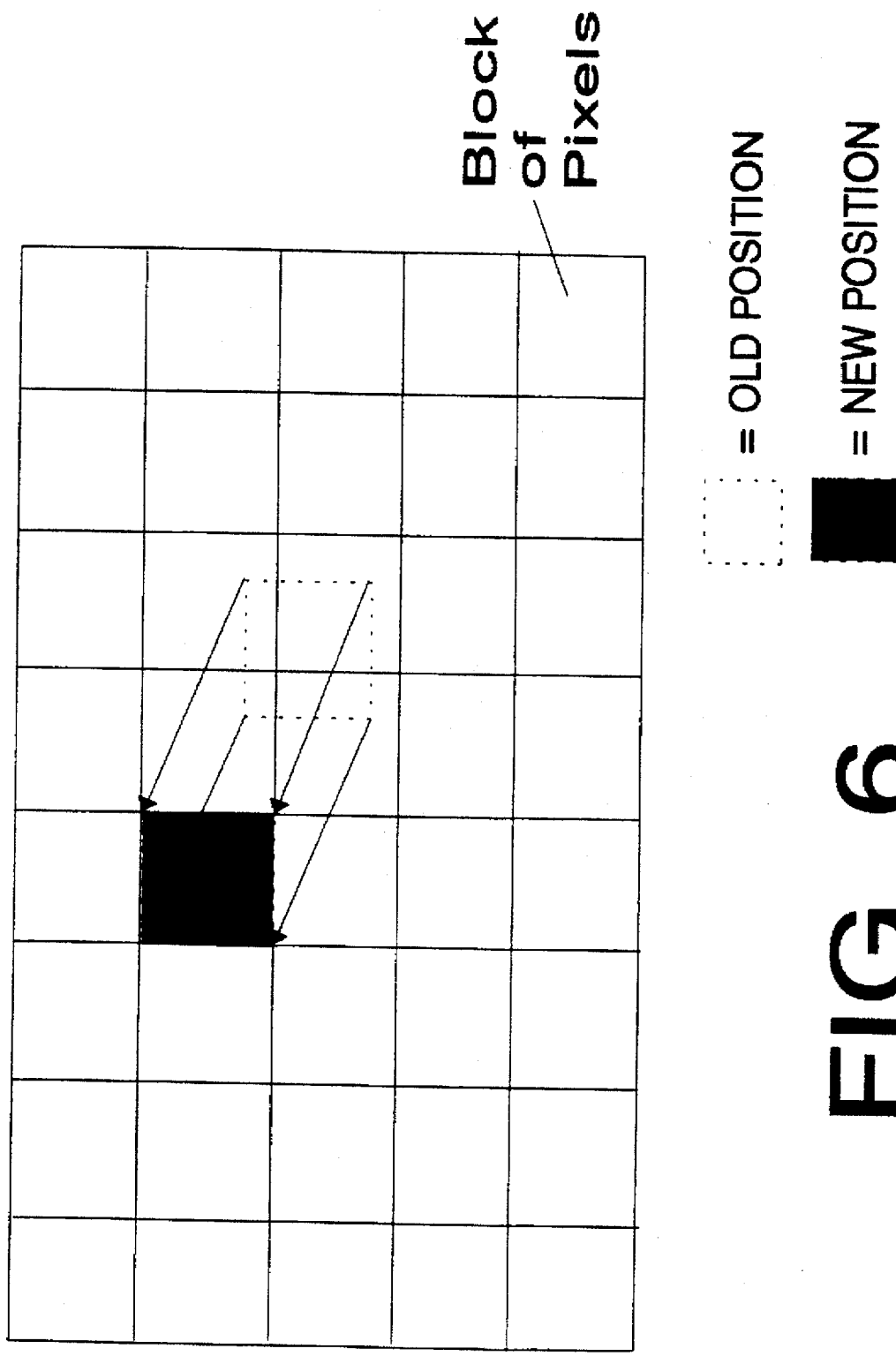
FIG. 6 is a diagram illustrating an output picture of a temporal deinterlacer depicted in FIG. 4.

After the spatial interpolation process, the temporal deinterlacer 16A performs a block motion process. As an example, FIG. 6 shows a portion of the output picture of the temporal deinterlacer. For an illustrative purpose, the picture is divided into blocks of pixels (i.e., each square box is a block of pixels). Each block of pixels may be 16×16 in size. For MPEG systems, for example, the motion compensation decision is available for every 16×16 block of pixels. Other systems may use different block size and/or motion vector resolution, and the temporal deinterlacer could be designed accordingly.

Each block of the temporal deinterlacer output picture comes from the interpolated picture. The locations of the blocks with reference to the interpolated picture are indicated by the motion vectors. For example, the shaded block ("new position") in FIG. 6 is generated from the interpolated picture block of pixels whose spatial location coincides with the dashed block ("old position"). The arrows pointing from the dashed block to the shaded block correspond to the motion vector for the generation of the shaded block. The generation of the output picture is done from block to block. Note that in some blocks where the motion vectors are "0", the output picture blocks will be the interpolated picture blocks at the same spatial locations, i.e., the old and new positions of the block will be the same.

Although the above example has been discussed in terms of a block of 16×16 pixels, the block may contain N×N pixels, where N is an integer. For example, if N is equal to 1, then the block of pixel will simply be one pixel. In this case, more computation may be required in the encoding process. However, once the encoding process is done, the deinterlace system of the present invention can use the "pixel based" (as opposed to "block based") motion information to achieve a more accurate result of the picture.

A number of variations to the embodiment of the present invention are possible. For example, the temporal deinterlacer can operate not only on the interlace field preceding the current interlace field, but also on the field following the current interlace field. This is because these two fields will have the same "polarity," i.e., they would be either both F1 or F2, albeit from two consecutive frames. The picture memory requirement, in this case, will increase. However, in MPEG-2 systems in which "backward" motion compensation is used (for example, in the predictive coding of bidirectional frames, or B-frames), the additional picture memory is already present to support the compression decoding process. Furthermore, the motion vectors for backward motion compensation can be similarly processed (i.e., scaled from 30-Hz to 60-Hz, as described before) and applied to the field which follows the current field. In this case, it may be desirable to average the two temporal components using, for example, a simple 2-tap FIR filter, as described in the spatial deinterlacer above. The concept of the filter direction, when the filter is applied across the two temporal pictures, will be the motion trajectory as indicated by the motion vectors.

Another variation is to use the deinterlace output picture of the preceding field, F1 in the discussion above, instead of the interlace field F1, for the temporal deinterlacer operations. This implementation will require a separate picture memory for the deinterlace picture. The benefit of using the deinterlace output picture in such a recursive fashion is in the improvement of the deinterlace operations over the simple spatial interpolation process during the first stage of the temporal deinterlacer operation.

Accordingly, the present invention takes advantage of both traditional "stand-alone" deinterlace methods as well as digitally assisted motion-compensated deinterlace methods. In particular, the advantage of a motion-compensated deinterlace is realized while minimizing the computational complexity and cost associated with a motion estimator at the receiver. This is achieved in the present invention by applying the motion information from the motion estimator used in the video compression encoding process, i.e., by using the motion estimator at the encoder rather than at the receiver.

The motion information from the encoder, which is transmitted to successfully decode the video data, is put to additional use, namely, to generate a motion model, albeit at a lower resolution than the picture. Based on that model, a temporal element of the deinterlace picture is generated. For example, a simple interpolation method may be applied along the motion trajectories which are derived from the motion information from the video compression encoder. A spatial element for the deinterlace picture is also generated and may be combined with the temporal element to generate the final deinterlace picture.

The compressed motion information can be used to infer areas of a picture where motion is minimal or the presence of highly complex spatial pattern which can often mislead motion estimation algorithms. In such areas of the picture, the temporal element may be generated from the previous interlace field. If a spatially complex pattern is present (as indicated by the compression motion information, for example, or the lack thereof), the temporal element may be suppressed and only spatial element may form the deinterlace picture for those areas of spatially complex pattern.

The deinterlacing system of the present invention is useful for many different types of applications such as high definition television and computers with non-interlace monitors.

It will be apparent to those skilled in the art that various modifications and variations can be made in the system for deinterlacing digitally compressed video of the present invention without departing from the spirit or scope of the invention. Thus it is intended that the present invention cover the modifications and variations of this invention provided they come within the scope of the appended claims and their equivalents.

What is claimed is:

1. A system for deinterlacing encoded video data comprising:
   a demultiplexer for receiving the encoded video data and extracting motion information and compressed video data corresponding to the encoded video data, the compressed video data including residual data;
   a motion compensated predictor for generating predicted image data based on the motion information corresponding to the encoded video data;
   a variable length decoder for decoding the compressed video data corresponding to the encoded video data received through the demultiplexer to produce the residual data;
   means for combining the residual data and the predicted image data to generate an interlace field;
   a memory for storing picture data corresponding to the interlace field;
   a controller for processing the motion information and generating motion vectors and at least one control signal corresponding to the motion information; and
   a motion compensated deinterlacer for manipulating the picture data corresponding to the interlace field received as output from the memory according to the motion vectors and the control signal to generate a corresponding deinterlaced picture;
   wherein the controller includes means for scaling the motion vectors, including horizontal and vertical components, by converting the motion vectors from a first frequency to a second frequency.

2. A system for deinterlacing encoded video data comprising:
   a demultiplexer for receiving the encoded video data and extracting motion information and compressed video data corresponding to the encoded video data, the compressed video data including residual data;
   a motion compensated predictor for generating predicted image data based on the motion information corresponding to the encoded video data;
   a variable length decoder for decoding the compressed video data corresponding to the encoded video data received through the demultiplexer to produce the residual data;
   means for combining the residual data and the predicted image data to generate an interlace field;
   a memory for storing picture data corresponding to the interlace field;
   a controller for processing the motion information and generating motion vectors and at least one control signal corresponding to the motion information; and
   a motion compensated deinterlacer for manipulating the picture data corresponding to the interlace field received as output from the memory according to the motion vectors and the control signal to generate a corresponding deinterlaced picture;
   wherein the motion compensated deinterlacer comprises:
      a temporal deinterlacer for receiving the motion vectors and corresponding picture data of a first interlace field and for performing a spatial interpolation process and a block motion process on the interlace field;
      a spatial deinterlacer for receiving the picture data of a second interlace field and performing a spatial interpolation process on the interlace field, separately from the temporal deinterlacer;
      means for determining whether to add outputs of the temporal and spatial deinterlacers according to the control signal;
      an adder for adding the outputs of the temporal and spatial deinterlacers in response to the determining means and generating resultant scan lines; and means for outputting the scan lines from the adder.

3. A system according to claim 2 or 1, wherein the combining means is an adder.

4. The system according to claim 2, further comprising:
a multiplier for multiplying the resultant scan lines from the adder by a predetermined number in response to the determining means; and
a line multiplexer for multiplexing the scan lines from the adder.

5. The system according to claim 4, wherein the predetermined number is ½.

6. The system according to claim 2, wherein the spatial deinterlacer operates on an interlace field currently undergoing the deinterlace process.

7. The system according to claim 2, wherein the temporal and spatial deinterlacers include a directional low pass filter for averaging pixel values between lines of an interlace field.

8. The system according to claim 7, wherein the directional low pass filter is a 2-tap finite impulse response filter for averaging two input pixel values.

9. The system according to claim 2, further including means for suppressing output of the temporal deinterlacer.

10. The system according to claim 3 or 1, wherein the motion information further includes a second control signal and second motion vectors, said second control signal being applied to the logical circuit and said second motion vectors replacing the picture data for display at times when the picture data are in an unusable condition.

11. The system according to claim 10, wherein second motion vectors include concealment motion vectors used under a mode of operation that suppresses motion vectors.

12. The system according to claim 2, wherein the spatial deinterlacer includes a directional spatial interpolator for performing the spatial interpolation process.

13. The system according to claim 12, wherein the first frequency is approximately 30 Hz and the second frequency is approximately 60 Hz.

14. The system according to claim 12, wherein the controller comprises a motion information processor comprising:
a first multiplier for multiplying the horizontal component of the motion vectors at the first frequency with a predetermined number;
a second multiplier for multiplying the vertical component of the motion vectors at the first frequency with the predetermined number;
a logic circuit for operating on the control signal; and
a second memory for storing outputs from the first and second multipliers and the logic circuit and generating a deinterlace control signal and the motion vectors, including the horizontal and vertical components, of the second frequency.

15. The system according to claim 14, wherein the second memory includes a RAM and serves as a delay compensator and a latch for the processed motion information.

16. The system according to claim 14, wherein the second memory is a RAM and serves to compensate for a delay from a time when the motion vectors for the pixel block is available to a time when the pixel block is deinterlaced.

17. The system according to claim 12, wherein the directional spatial interpolator includes:
first pixel delay means for receiving the picture data of the second interlace field and delaying the picture data in pixel units, the first pixel delay means outputting first pixel data and a plurality of first output data;
a line delay means for receiving the first pixel data from the first pixel delay means and delaying the first pixel data;
second pixel delay means for receiving the delayed first pixel data and further delaying the delayed first pixel data in pixel units, the second pixel delay means outputting second pixel data and a plurality of second output data;
means for receiving the plurality of first and second output data from the first and second pixel delay means, respectively, and determining corresponding plurality of averages of the plurality of first and second output data;
means for receiving the plurality of first and second output data from the first and second pixel delay means, respectively, and determining corresponding plurality of differences between the plurality of first and second output data;
a selection logic circuit for receiving the plurality of differences from the difference determining means and selecting a direction value corresponding to the plurality of differences; and
an interpolator for receiving the plurality of averages from the average determining means and the direction value from the selection logic circuit and outputting one of the plurality of averages according to the direction value.

18. The system according to claim 17, further comprising a multiplexer for receiving the second pixel data from the second pixel means and said one of the plurality of averages from the interpolator and for outputting interpolated data multiplexed between the second pixel data and said one of the plurality of averages.

19. The system according to claim 17, wherein the first pixel delay means includes a plurality of single pixel delay elements, each of the single pixel delay elements outputting an output corresponding one of the first output data to the difference determining means and the average determining means.

20. The system according to claim 19, wherein each of the first output data is delayed from one another by one pixel corresponding to each of the single pixel delay elements.

21. The system according to claim 17, wherein the second pixel delay means includes a plurality of single pixel delay elements, each of the single pixel delay elements outputting second output data to the difference determining means and the average determining means.

22. The system according to claim 21, wherein each of the second output data is delayed from one another by one pixel corresponding to each of the single pixel delay elements.

23. The system according to claim 17, wherein the difference determining means includes a plurality of difference operators, each of the difference operators receiving corresponding said first output data and second output data, each of said first output data being one pixel delay from one another, each of said second output data being one pixel delay from one another.

24. The system according to claim 17, wherein the average determining means includes a plurality of average operators, each of the average operators receiving corresponding said first output data and second output data, each of said first output data being one pixel delay from one another, each of said second output data being one pixel delay from one another.

25. The system according to claim 17, wherein the difference determining means and the average determining means are combined to form a plurality of average-and-difference operators, each of the average-and-difference operators receiving corresponding said first output data and second output data, each of said first output data being one pixel delay from one another, each of said second output data being one pixel delay from one another.

26. The system according to claim 17, wherein the line delay means delays the first pixel data by a delay of one scan line minus a plurality of single pixel delays.

27. The system according to claim 26, wherein the plurality of single pixel delays has four pixel delays, the four pixel delays allowing a one scan line delay between the first pixel delay means and the second pixel delay means.

28. The system according to claim 17, wherein the selection logic circuit includes:
    means for reading the plurality of differences from the difference determining means;
    means for determining a maximum value from the plurality of differences;
    means for comparing the maximum value to a first threshold value;
    means for selecting the direction value corresponding to a vertical direction when the maximum value is less than the threshold value; and
    means for outputting the direction value.

29. The system according to claim 28, wherein the first threshold value corresponds to a threshold for determine whether an image is in a textured area.

30. The system according to claim 28, wherein the selection logic circuit further includes:
    means for determining a minimum value from the plurality of differences when the maximum value is greater than or equal to the first threshold value;
    means for computing a difference between the maximum value and the minimum value;
    means for comparing the difference between the maximum and minimum values to a second threshold value;
    means for selecting the direction value corresponding to the vertical direction when the difference between the maximum and minimum values is less than the second threshold value; and
    means for selecting the direction value according to a direction corresponding to the minimum value when the difference between the maximum and minimum values is greater than or equal to the second threshold value.

31. The system according to claim 30, wherein the second threshold value corresponds to a threshold for determine whether an image is in a flat area.

32. The system according to claim 17, wherein the interpolator includes switches to output said one of the averages corresponding to the direction value.

33. The system according to claim 32, wherein the direction value corresponds to one of the plurality of differences having a minimum value.

34. The system according to claim 2 or 1, wherein the motion vectors correspond to a motion trajectory of a block of predetermined number of pixels.

35. The system according to claim 34, wherein the block of the predetermined number of pixels has a size of 16×16 pixels.

36. The system according to claim 2 or 1, wherein the picture memory has two sections, each section corresponding to one of two interlace fields.

37. A method for deinterlacing encoded video data comprising the steps of:
    receiving the encoded video data and extracting motion information and compressed video data corresponding to the encoded video data;
    predicting image data according to the motion information corresponding to the encoded video data;
    decoding the compressed video data corresponding to the encoded video data to produce residual data:
    combining the image data and the residual data to generate an interlace field;
    storing picture data corresponding to the interlace field;
    processing the motion information and generating motion vectors and at least one control signal corresponding to the motion information; and
    manipulating the picture data corresponding to the interlace field from the memory according to the motion vectors and the control signal to generate a corresponding deinterlaced picture;
    wherein the processing step scales the motion vectors, including horizontal and vertical components, by converting the motion vectors from a first frequency to a second frequency.

38. A method for deinterlacing encoded video data comprising the steps of:
    receiving the encoded video data and extracting motion information and compressed video data corresponding to the encoded video data;
    predicting image data according to the motion information corresponding to the encoded video data;
    decoding the compressed video data corresponding to the encoded video data to produce residual data;
    combining the image data and the residual data to generate an interlace field;
    storing picture data corresponding to the interlace field:
    processing the motion information and generating motion vectors and at least one control signal corresponding to the motion information; and
    manipulating the picture data corresponding to the interlace field from the memory according to the motion vectors and the control signal to generate a corresponding deinterlaced picture;
    wherein the manipulating step comprises the steps of:
        performing temporal deinterlacing using the motion vectors and the picture data;
        performing spatial deinterlacing using the picture data;
        determining whether to add results of the temporal deinterlacing and the spatial deinterlacing according to the control signal;
        adding the results of the temporal and spatial deinterlacers in response to the determining step and generating resultant scan lines; and
        outputting the scan lines from the adding step.

39. The method according to claim 38 or 37, wherein the combining step adds the image data and the residual data to generate the interlace field.

40. The method according to claim 37, wherein the processing step comprises the steps of:
    first multiplying the horizontal component of the motion vectors at the first frequency with a predetermined number;
    second multiplying the vertical component of the motion vectors at the first frequency with the predetermined number;
    performing a logical operation on the control signal; and
    storing outputs from results of the first and second multiplying steps and the performing step to generate a deinterlacing control signal and the motion vectors of the second frequency, including the horizontal and vertical components.

41. The method according to claim 38 or 37, further comprising the step of:

determining whether the picture data is in a usable condition; and replacing the picture data with predetermined motion vectors for display at times when the picture data are determined to be in an unusable condition.

42. The method according to claim 41, further comprising the step of suppressing use of the motion vectors from the motion information at times when the predetermined motion vectors are used for display.

43. The method according to claim 38, further comprising the steps of:

multiplying the resultant scan lines from the adding step by a predetermined number in response to the determining step; and multiplexing the scan lines from the adding step.

44. The method according to claim 38, further including the step of suppressing output of the temporal deinterlacing.

45. The method according to claim 38, wherein the step of performing the spatial deinterlacing averages pixel values between lines of an interlace field.

46. The method according to claim 38, wherein the step of performing spatial interpolation includes the steps of:

delaying the picture data in pixel units and outputting first pixel data and a plurality of first output data;

delaying the first pixel data;

further delaying the delayed first pixel data in pixel units and outputting second pixel data and a plurality of second output data;

determining corresponding plurality of averages of the plurality of first and second output data;

determining corresponding plurality of differences between the plurality of first and second output data;

selecting a direction value corresponding to the plurality of differences; and receiving the plurality of averages from the average determining means and the direction value and outputting one of the plurality of averages according to the direction value.

47. The method according to claim 46, further comprising the step of multiplexing the second pixel data from the second pixel means and said one of the plurality of averages and outputting interpolated data multiplexed between the second pixel data and said one of the plurality of averages.

48. The method according to claim 46, wherein the step of delaying the first pixel data delays the first pixel data by one scan line minus a plurality of single pixel delays.

49. The method according to claim 48, wherein the plurality of single pixel delays has four pixel delays, the four pixel delays allowing a one scan line delay between the first pixel delay means and the second pixel delay means.

50. The method according to claim 46, wherein the selecting step includes the steps of:

reading the plurality of differences from the difference determining step;

determining a maximum value from the plurality of differences;

comparing the maximum value to a first threshold value;

selecting the direction value corresponding to a vertical direction when the maximum value is less than the threshold value; and outputting the direction value.

51. The method according to claim 50, wherein the first threshold value corresponds to a threshold for determine whether an image is in a textured area.

52. The method according to claim 50, wherein the selecting step further includes the steps of:

determining a minimum value from the plurality of differences when the maximum value is greater than or equal to the first threshold value;

computing a difference between the maximum value and the minimum value;

comparing the difference between the maximum and minimum values to a second threshold value;

selecting the direction value corresponding to the vertical direction when the difference between the maximum and minimum values is less than the second threshold value; and selecting the direction value according to a direction corresponding to the minimum value when the difference between the maximum and minimum values is greater than or equal to the second threshold value.

53. The system according to claim 52, wherein the second threshold value corresponds to a threshold for determine whether an image is in a flat area.

* * * * *